United States Patent [19]

Blaimschein

[11] Patent Number: 4,774,746
[45] Date of Patent: Oct. 4, 1988

[54] END-FORMING MACHINE

[75] Inventor: Gottfried Blaimschein, Steyr, Austria

[73] Assignee: GFM Gesellschaft für Fertigungstechnik und Masachinenbau Gesellschaft m.b.H., Steyr, Austria

[21] Appl. No.: 30,158

[22] Filed: Mar. 24, 1987

[30] Foreign Application Priority Data

Apr. 4, 1986 [EP] European Pat. Off. ........ 86890094.5

[51] Int. Cl.$^4$ .......................... B23C 3/06; B23P 23/02
[52] U.S. Cl. ................... 29/26 A; 409/190; 409/199; 82/20
[58] Field of Search ............... 29/26 A, 27 R, 27 C, 29/564; 409/143, 228, 240, 199, 200, 190; 82/2 E, 20; 51/73 GC; 408/22, 24, 25, 26, 30

[56] References Cited

U.S. PATENT DOCUMENTS

| | | | |
|---|---|---|---|
| 3,479,735 | 11/1969 | Miles, Jr. et al. | 29/564 |
| 3,817,149 | 6/1974 | Reutlinger | 82/20 |
| 4,171,654 | 10/1979 | Kreucher | 82/20 |
| 4,208,156 | 6/1980 | Kralowetz et al. | 409/200 |
| 4,559,681 | 12/1985 | Coquillart et al. | 29/26 A |

FOREIGN PATENT DOCUMENTS

| | | | |
|---|---|---|---|
| 123769 | 11/1984 | European Pat. Off. | 409/143 |
| 148865 | 6/1981 | German Democratic Rep. | 408/22 |
| 137368 | 6/1960 | U.S.S.R. | 29/27 |
| 8203810 | 11/1982 | PCT Int'l Appl. | 409/143 |

Primary Examiner—Gil Weidenfeld
Assistant Examiner—Daniel W. Howell
Attorney, Agent, or Firm—Kurt Kelman

[57] ABSTRACT

An end-forming machine tool comprises a machine bed (1), which carries workpiece-gripping means (2) and at least one headstock (3), which is guided for a displacement along the axis of the workpiece relative to the workpiece-gripping means. In order to permit efficient forming operations to be performed within a short time and to achieve a high precision and high surface finish in conjunction with long edge lives of the tools, the machine bed (1) is provided with a milling unit (4), which is disposed between the workpiece-gripping means (2) and the headstock (3) and is displaceable along the axis of the workpiece. The milling unit (4) is provided with an internally cutting annular inserted-tooth cutter, which is adapted to be driven and rotatably mounted in a tool slide (7), which is movable transversely to the axial direction of the workpiece.

2 Claims, 2 Drawing Sheets

END-FORMING MACHINE

BACKGROUND OF THE INVENTION

1. Field of the Invention

This invention relates to an end-forming machine comprising a bed, which is provided with a workpiece-gripping means and with at least one headstock, which is guided for a displacement along the axis of the workpiece relative the workpiece-gripping means.

2. Description of the Prior Art

End-forming machine tools are used to center, drill, bore, cut to length, profile or chamfer workpieces, particularly shafts and tubes, and to subject the workpieces to other machining operations at their ends. The workpiece-gripping means grip the workpiece at a distance from the end to be formed so that that end is exposed for the desired forming operation. The forming operation proper has previously been performed only by tools carried by the headstocks, which are known in various forms and can be used as single-spindle or multi-spindle headstocks. Such headstocks may be provided with any of a large number of specific toolholders, which are designed to perform specific or combined machining operations. In spite of the large number of toolholders and tools which can be selected, such forming of ends is not satisfactory because a high expenditure is involved and any attempt to reduce the machining time will be at the expense of the precision and surface finish which can be achieved and of the edge life of the tool. For this reason the steadily increasing requirements regarding shorter machining times, a higher precision and surface finish, and a longer edge life, can be met only with a compromise. It must be borne in mind that the dimensions of the toolholders must be selected in adaptation to the workpieces involved and for surface-finishing operations the cutting circles of the cutting tools employed must lie within a rather small diameter, which will depend on the workpiece diameter. For this reason rather different cutting speeds will be obtained when a plurality of radially offset workpieces, such as required for combined machining operations, are employed. Such different cutting speeds will result in a lower precision and surface finish and in a shorter edge life. On the other hand if a toolholder is used which is provided with only one cutting tool, the precision and the surface finish as well as the edge life can be improved by the selection of proper cutting conditions but a plurality of forming operations will be required, which involve a change of the toolholder or spindle so that the required machining time cannot be reduced.

SUMMARY OF THE INVENTION

It is an object of the invention to eliminate these disadvantages and to provide an end-forming machine which is of the kind described first hereinbefore and which permits efficient end-forming operations resulting in a high precision and a high surface finish to be performed within a very short time while a long edge life of the tools is ensured.

This object is accomplished in accordance with the invention in that the machine bed carries a milling unit, which is disposed between the workpiece-gripping means and the headstock and is guided for a displacement along the axis of the workpiece and carries an internally cutting, annular inserted-tooth cutter, which is adapted to be driven and is rotatably mounted in a tool slide that is movable transversely to the axial direction of the workpiece. That internally cutting milling cutter may be used for cutting to length, surface milling, profiling and other machining operations for which an internally cutting milling cutter can be employed and also when used for end-forming operations will afford all advantages which are typical of such a cutter, such as a high cutting speed, a machining to a high precision and high surface finish, and a long edge life of the inserted-tooth cutter. Because the inside diameter of the internally cutting milling cutter is highly independent of the diameter of the workpiece and will be a multiple of the workpiece diameter, there will be only a small difference between the circumferential and cutting speeds even when radially offset cutting tips are used for desired combined end-forming operations. This is due to the fact that the spacing of the tips will be only relatively small relative to the radius. The differences between the circumferential and cutting speeds will be so small that they will not adversely affect the precision and the surface finish obtained nor the edge life of the tools. For this reason the internally cutting milling cutter can be used to profile and surface-finish the workpiece at its ends as desired in a single operation and permits the headstock to be used in a desirable manner, e.g., for a simple drilling and/or boring operation, so that the workpieces can be machined at their diameter and can be drilled and/or bored at the same time without a need for any compromise regarding precision and surface finish, machining time and tool edge life.

DETAILED DESCRIPTION OF THE PREFERRED EMBODIMENT

Figure 1:
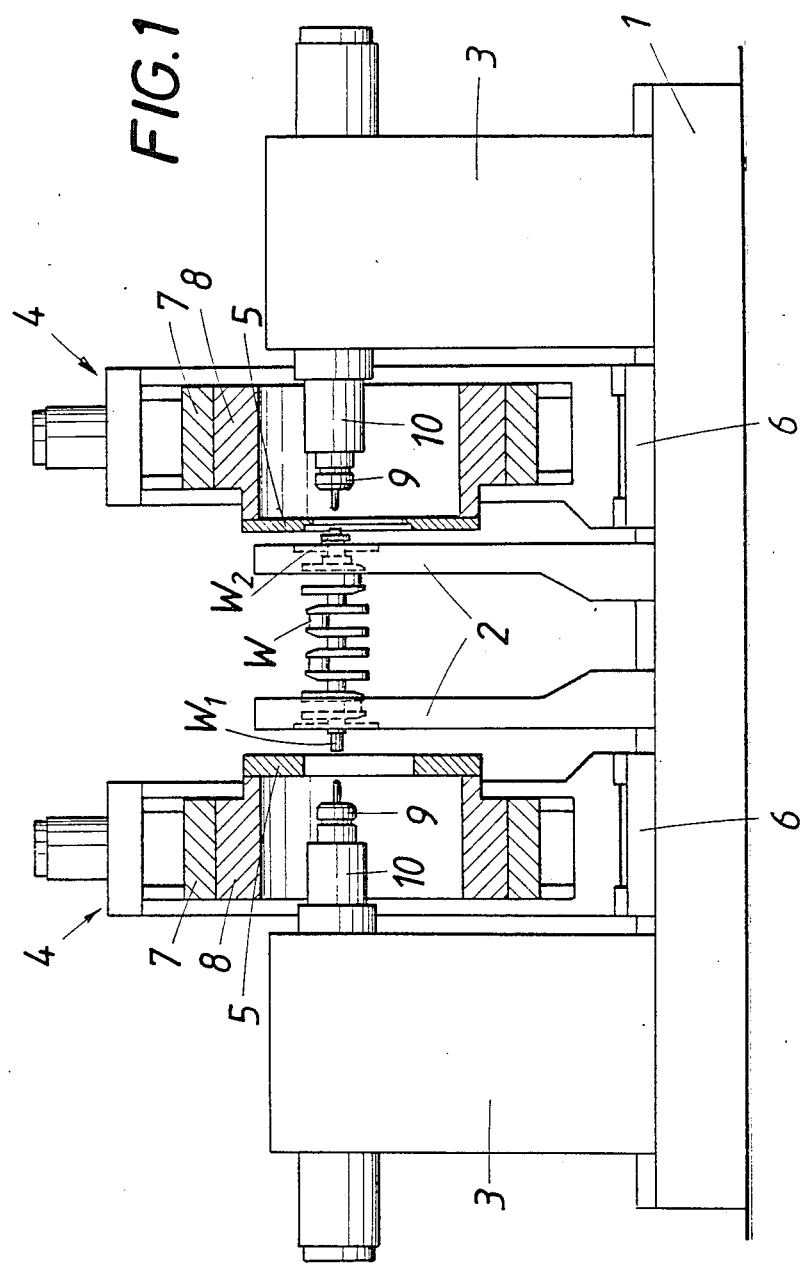
FIG. 1 is a front elevation showing partly in section an end-forming machine embodying the invention.

An embodiment of the invention will now be explained by way of example with reference to the drawing.

A machine bed 1 carries workpiece-gripping means with two gripping heads 2 for gripping a workpiece W at portions which are spaced from the ends of the workpiece. For a machining of the workpiece W at both ends $W_1$, $W_2$ at the same time, two headstocks 3 are provided, which are disposed on those sides of the workpiece-gripping heads 2 which are remote from each other. The two head-stocks 3 are guided on the machine bed 1 for a displacement parallel to the axis of the workpiece that is gripped by the gripping heads 2. The machine bed also carries two milling units 4, each of which is disposed between a respective workpiece-gripping head 2 and a headstock 3 and comprises an internally cutting annular inserted-tooth cutter 5. A carriage 6 supports each milling unit and is also guided on the machine bed 1 for a displacement parallel to the axis of the tool W gripped by the gripping heads 2. Each carriage carries a tool slide 7, which carries the associated inserted-tooth cutter 5 and is displaceable transversely to the axis of the tool W that is gripped by the gripping heads 2. A toolholding drum 8 is rotatably mounted and adapted to be driven in the tool slide 7 and each inserted-tooth cutter 5 is secured to the associated drum 8 at that end thereof which faces the gripping heads 2. At the opposite end of each drum 8, the same is adapted to receive a toolholder 9, which is rotatably mounted on a protruding neck 10 of the adjacent headstock 3.

Figure 2:
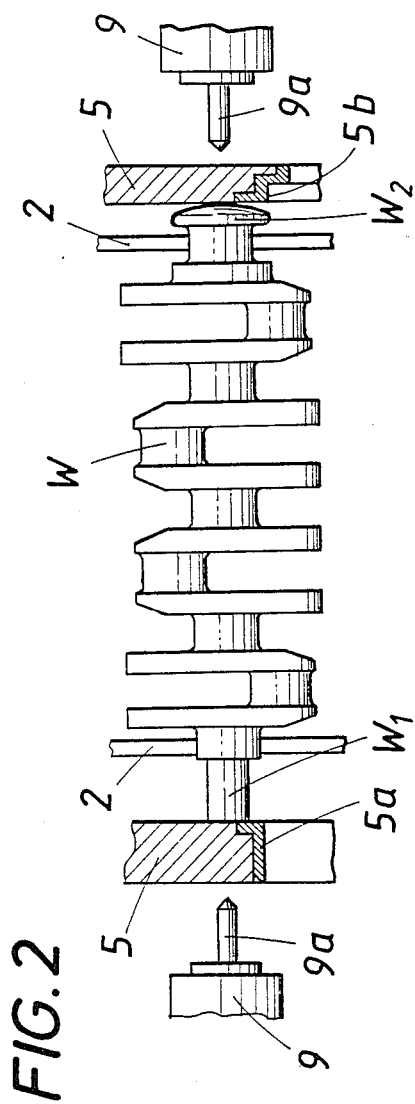
FIGS. 2 and 3 diagrammatically two operations performed by said machine.
Figure 3:
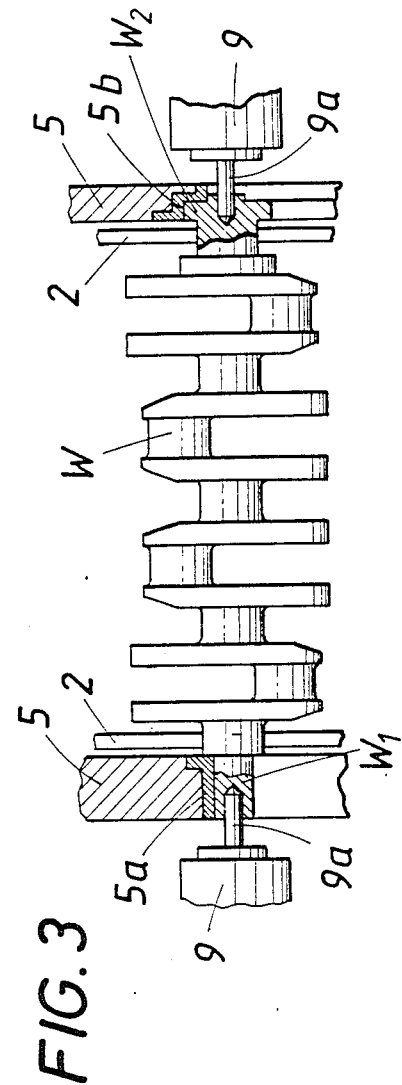

As is apparent from FIGS. 2 and 3 the workpiece W which is gripped by the gripping heads 2 may consist of a crankshaft and can be efficiently machined at its two ends $W_1$ and $W_2$, which respectively consist of a mainshaft end and a flanged end. For this purpose a drilling tool and/or a boring tool 9a may be inserted into the toolholder 9 of each headstock 3 and the milling units 4 are provided with respective inserted-tooth cutters 5, in which cutting tips 5a and 5b are so arranged that they can be used to machine not only the end surfaces but to surface-finish the entire shaft or flange portion of the end portions $W_1$ and $W_2$, respectively. When the drilling and/or boring tools 9a have been retracted, the inserted-tooth cutters 5 may be used to exactly cut the workpiece W to length (FIG. 2). Thereafter the inserted-tooth cutters 5 may be axially displaced as required and another machining operation may be performed to jointly machine all surfaces of the shaft and flange portions at both ends $W_1$, $W_2$ and to form the axial bores (FIG. 3) at the same time. The two ends are thus machined with a short time, a high precision and a high surface finish are obtained, and the tools have long edge lives.

What is claimed is:

1. A machine for forming an end of a workpiece having an axis, which comprises
   (a) a machine bed,
   (b) workpiece gripping means mounted on the machine bed for gripping the workpiece,
   (c) a headstock spaced from the gripping means and mounted on the machine bed for displacement parallel to the workpiece axis and relative to the gripping means,
   (d) a milling unit mounted on the machine bed between the gripping means and the headstock for displacement parallel to the workpiece axis and relative to the headstock, the milling unit comprising
      (1) a tool slide displaceable transversely to the workpiece axis, and
      (2) an internal milling center rotatably mounted on the tool slide and adapted to be driven, and
   (e) a tool holder mounted on the headstock for rotation about the workpiece axis.

2. The end-forming machine of claim 1, further comprising a second headstock mounted on the machine bed facing toward the first headstock for displacement parallel to the workpiece axis, wherein the workpiece gripping means comprises two gripping heads respectively gripping the workpiece at a portion thereof spaced from a respective one of the workpiece ends, and a respective one of the headstocks is spaced from a respective one of the gripping heads.

* * * * *